(12) United States Patent
Amine et al.

(10) Patent No.: US 7,851,092 B2
(45) Date of Patent: Dec. 14, 2010

(54) REDOX SHUTTLES FOR OVERCHARGE PROTECTION OF LITHIUM BATTERIES

(75) Inventors: Khalil Amine, Downers Grove, IL (US); Zonghai Chen, Downers Grove, IL (US); Qingzheng Wang, San Jose, CA (US)

(73) Assignee: U Chicago Argonne LLC, Chicago, IL (US)

( * ) Notice: Subject to any disclaimer, the term of this patent is extended or adjusted under 35 U.S.C. 154(b) by 1323 days.

(21) Appl. No.: 11/366,891

(22) Filed: Mar. 1, 2006

(65) Prior Publication Data

US 2006/0199080 A1    Sep. 7, 2006

Related U.S. Application Data

(60) Provisional application No. 60/657,850, filed on Mar. 2, 2005.

(51) Int. Cl.
*H01M 1/40*   (2006.01)
(52) U.S. Cl. .................................. 429/326; 429/212
(58) Field of Classification Search ............... 429/326, 429/212, 246, 327, 328, 329
See application file for complete search history.

(56) References Cited

U.S. PATENT DOCUMENTS

| | | | |
|---|---|---|---|
| 4,513,143 A | 4/1985 | Ng et al. | |
| 4,857,423 A | 8/1989 | Abraham et al. | |
| 5,487,959 A | 1/1996 | Koksbang | |
| 5,709,968 A * | 1/1998 | Shimizu | 429/324 |
| 5,731,106 A | 3/1998 | Tsutsumi et al. | |
| 5,763,119 A | 6/1998 | Adachi | |
| 5,824,434 A | 10/1998 | Kawakami et al. | |
| 5,849,432 A | 12/1998 | Angell et al. | |
| 5,858,573 A | 1/1999 | Abraham et al. | |
| 6,004,698 A | 12/1999 | Richardson et al. | |
| 6,045,952 A | 4/2000 | Kerr et al. | |
| 6,074,777 A | 6/2000 | Reimers et al. | |
| 6,207,326 B1 | 3/2001 | Kawakami et al. | |

(Continued)

FOREIGN PATENT DOCUMENTS

JP          75000095        1/1975

OTHER PUBLICATIONS

International Search Report for PCT Application No. PCT/US06/08664, dated Dec. 13, 2006.

(Continued)

*Primary Examiner*—Jennifer Michener
*Assistant Examiner*—Monique Wills
(74) *Attorney, Agent, or Firm*—Foley & Lardner LLP

(57) ABSTRACT

The present invention is generally related to electrolytes containing novel redox shuttles for overcharge protection of lithium-ion batteries. The redox shuttles are capable of thousands hours of overcharge tolerance and have a redox potential at about 3-5.5 V vs. Li and particularly about 4.4-4.8 V vs. Li. Accordingly, in one aspect the invention provides electrolytes comprising an alkali metal salt; a polar aprotic solvent; and a redox shuttle additive that is an aromatic compound having at least one aromatic ring with four or more electronegative substituents, two or more oxygen atoms bonded to the aromatic ring, and no hydrogen atoms bonded to the aromatic ring; and wherein the electrolyte solution is substantially non-aqueous. Further there are provided electrochemical devices employing the electrolyte and methods of making the electrolyte.

29 Claims, 5 Drawing Sheets

U.S. PATENT DOCUMENTS

| | | | |
|---|---|---|---|
| 6,232,021 | B1 | 5/2001 | Negoro |
| 6,291,107 | B1 | 9/2001 | Shimizu |
| 6,387,571 | B1 | 5/2002 | Lain et al. |
| 6,395,423 | B1 | 5/2002 | Kawakami et al. |
| 6,436,583 | B1 | 8/2002 | Mikhaylik |
| 6,506,516 | B1 | 1/2003 | Wietelmann et al. |
| 6,780,545 | B2 | 8/2004 | Birke-Salam et al. |
| 2002/0039687 | A1 | 4/2002 | Barker et al. |
| 2003/0091892 | A1 | 5/2003 | Watanabe et al. |
| 2003/0118912 | A1 | 6/2003 | Watanabe et al. |
| 2003/0190529 | A1 | 10/2003 | Kim et al. |
| 2004/0013944 | A1 | 1/2004 | Lee et al. |
| 2004/0028996 | A1 | 2/2004 | Hamamoto et al. |
| 2004/0029017 | A1 | 2/2004 | Besenhard et al. |
| 2004/0121239 | A1 | 6/2004 | Abe et al. |
| 2004/0131934 | A1 | 7/2004 | Sugnaux et al. |
| 2004/0157126 | A1 | 8/2004 | Belharouak et al. |
| 2004/0191633 | A1 | 9/2004 | Johnson et al. |
| 2004/0214091 | A1 | 10/2004 | Lim et al. |
| 2005/0019670 | A1* | 1/2005 | Amine et al. ............ 429/326 |
| 2005/0106470 | A1 | 5/2005 | Yoon et al. |
| 2005/0147891 | A1 | 7/2005 | Mikhaylik |
| 2005/0227143 | A1 | 10/2005 | Amine et al. |

OTHER PUBLICATIONS

International Search Report for PCT/US06/07297, dated Apr. 17, 2007.

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_x Mn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.*, vol. 148, No. 8, pp. A826-A832, 2001; published by The Electrochemical Society, Inc. Availible electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by The Chemical Society of Japan.

Notification Concerning Transmittal of International Preliminary Report on Patentability/Written Opinion for PCT/US2006/007297, dated Sep. 20, 2007.

\* cited by examiner

REDOX SHUTTLES FOR OVERCHARGE PROTECTION OF LITHIUM BATTERIES

CROSS-REFERENCES TO RELATED APPLICATIONS

This application claims priority to U.S. Provisional Application No. 60/657,850 filed Mar. 2, 2005, the entire disclosure of which is incorporated herein by reference.

GOVERNMENT RIGHTS

The United States Government has rights in this invention pursuant to Contract No. W31-109-ENG-38 between the U.S. Department of Energy and the University of Chicago representing Argonne National Laboratory.

FIELD OF THE INVENTION

The present invention relates in general to the field of lithium rechargeable batteries, and more particularly relates to additives to the non-aqueous electrolyte of lithium-ion batteries which provide intrinsic overcharge protection capability.

BACKGROUND OF THE INVENTION

Overcharge is a dangerous abuse of lithium-ion batteries. Overcharge generally occurs when a current is forced through the batteries and the charge delivered exceeds the charge-storing capability of the battery. Overcharge of lithium-ion batteries can lead to the chemical and electrochemical reaction of battery components, rapid temperature elevation, and can also trigger self-accelerating reactions in the batteries and even explosion. A redox shuttle is a chemical compound that is incorporated as an overcharge protection mechanism for lithium-ion batteries. Generally, the redox shuttle can be reversibly electrochemically oxidized and reduced at a potential slightly higher than the working potential of the positive electrode of lithium-ion batteries. With the incorporation of a redox shuttle into the electrolyte, the lithium-ion batteries can normally operate in a voltage range under the redox potential of the redox shuttle. If the battery is overcharged, the battery voltage will meet the redox potential of the redox shuttle first and activate the redox mechanism of the redox shuttle, which will proceed as the only active component to transfer the excessive charge through the battery without causing any damage. Under such a mechanism, the dangerous voltage of the battery will never be reached even when being overcharge-abused.

The research and development of redox shuttles for lithium-ion batteries can be traced back to 1980s. However, only two classes of redox shuttles are known. The initial effort was focused on derivatives of ferrocene, which are suitable for the 3 V class of lithium ion-batteries. It has been reported that certain aromatic compounds can be redox shuttles for state-of-the-art lithium-ion battery technology. However, the quantitative structure-activity relationship of the aromatic compounds is not well understood. For example, Adachi has proposed fluorinated dimethoxybenzene as a promising redox shuttle for 4 V class lithium-ion batteries in U.S. Pat. No. 5,763,119. However, it was later shown that none of the claimed fluorodimethoxybenzenes is stable enough to survive the basic low current overcharge test. J. Chen, C. Buhrmesters, and J. R. Dahn, *Electrochem. Solid-State Lee.*, 8(1): A59-A62 (2005). The only structure proved to sustain overcharging for thousands of hours is 2,5-di-(tert-butyl)-1,4-dimethoxybenzene reported by Chen and coworkers. A drawback of this compound is that its redox potential is about 3.9 V vs. $Li^0$, and can only work for $LiFePO_4$ positive electrode materials. Therefore, the compound cannot be used with the widely used, and commercially available positive electrode materials such as $LiMO_2$ (M=Co, Ni, Mn). The $LiMO_2$ (M=Co, Ni, Mn) materials have working potentials up to 4.2 V vs. $Li^0$. Therefore, redox shuttle additives with a range of redox potentials, but especially those at 4.4-4.5 V vs. $Li^0$, are highly desired for universal application in current lithium-ion battery technology.

SUMMARY OF THE INVENTION

The present invention is generally related to electrolytes containing novel redox shuttles for overcharge protection of lithium-ion batteries. The redox shuttles are capable of thousands hours of overcharge tolerance and have a redox potential of about 3 V to about 5.5 V vs. $Li^0$, and particularly about 4.4 to about 4.8 V vs. $Li^0$. Accordingly, in one aspect, the invention provides electrolytes comprising an alkali metal salt; a polar aprotic solvent; and a redox shuttle additive that is an aromatic compound having at least one aromatic ring with four or more electronegative substituents, two or more oxygen atoms bonded to the aromatic ring, and no hydrogen atoms bonded to the aromatic ring; and wherein the electrolyte solution is substantially non-aqueous. In another aspect there are provided electrochemical devices employing the electrolyte and methods of making the electrolyte.

DETAILED DESCRIPTION

Figure 1:
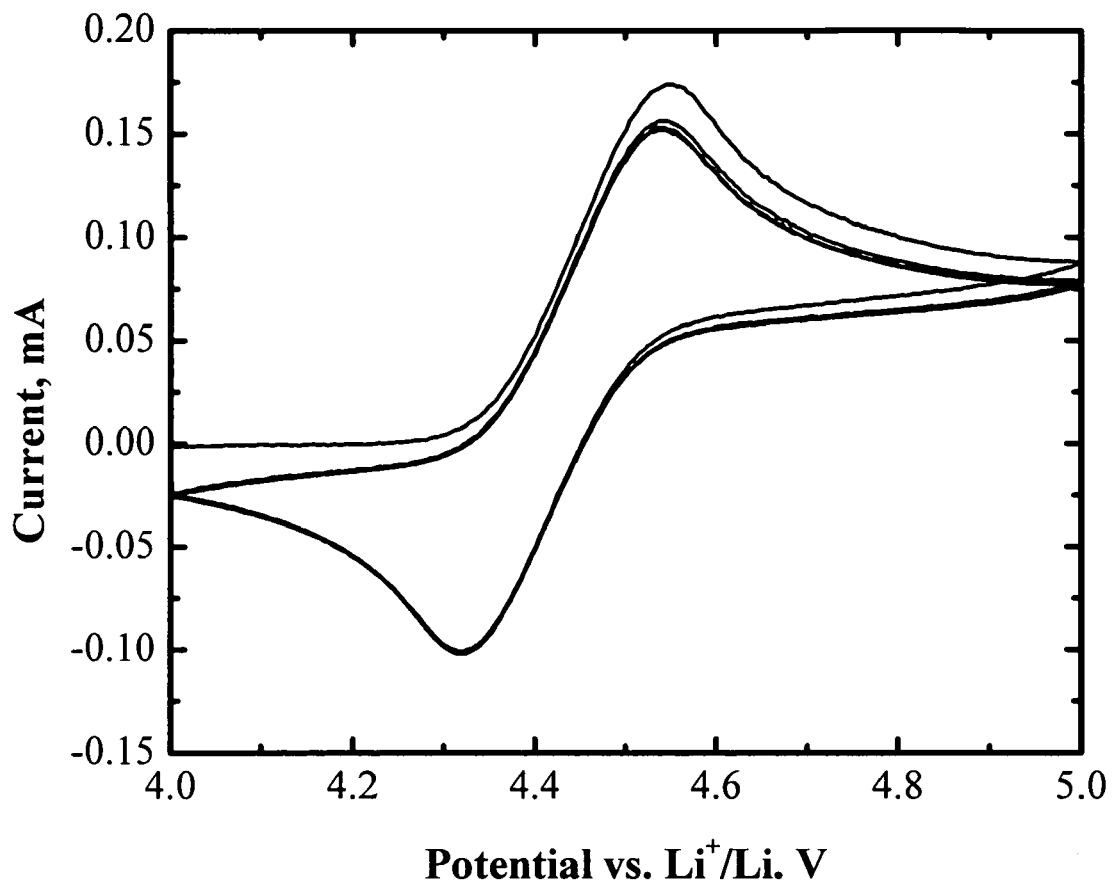
FIG. 1 is a cyclic voltammogram of 1.2 M $LiPF_6$ in EC/PC/DMC (1:1:3) with 3 wt % (tetrafluorobenzo-1,2-dioxyl)pentafluorophenyl-borane using a three electrode system (Pt working Electrode, Li counter electrode and Li reference electrode).

This invention relates to electrolytes containing novel redox shuttle additives of aromatic compounds for overcharge protection of lithium-ion batteries. More specifically, the aromatic compounds of this invention can be reversibly oxidized/reduced at a potential slightly higher than the working potential of the positive electrode in lithium-ion batteries.

In accordance with one aspect of the present invention, there are provided electrolytes that include an alkali metal salt; a polar aprotic solvent; and a redox shuttle additive that is an aromatic compound having at least one aromatic ring. Each aromatic ring includes four or more electronegative substituents, two or more oxygen atoms bonded to the aromatic ring, and no hydrogen atoms bonded to the aromatic ring. The electrolytes are substantially non-aqueous, i.e., the electrolytes contain either no water or almost no water (e.g., ≦100 ppm water). Redox shuttle additives of the invention have a redox potential of about 3 to about 5.5 V in the electrolyte, and more typically from about 4 to about 5 V. Suitable electronegative substituents include but are not limited to halogen, haloalkyl (e.g. fluoroalkyl), —CN, or —NO$_2$. Typically, the redox shuttle additive has two, three or four oxygen atoms. Mixtures of two or more of the aromatic compounds can also be used as the redox shuttle additive.

Redox shuttle additives of the invention include for example, compounds having Formula IA, IB, or IC:

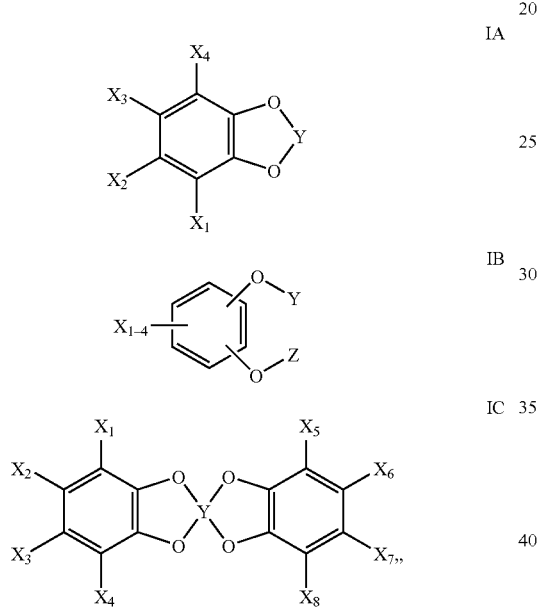

wherein X$_{1-8}$ are each independently selected from —F, —Cl, —Br, haloalkyl, —CN, or —NO$_2$; and Y and Z are independently a group having a N, B, C, Si, S, or P atom, where the N, B, C, Si, S, or P atom is attached to at least one of the two or more oxygen atoms bonded to the aromatic ring, as shown in structures IA, IB, and IC. Y and Z may individually be a terminal group or a bridging group.

In some embodiments, the redox shuttle has the Formula IA. Exemplary compounds having the Formula IA include the following structures:

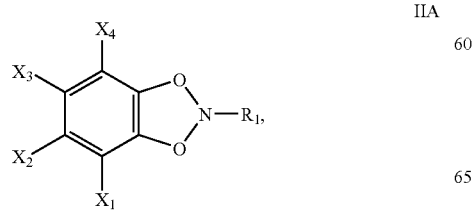

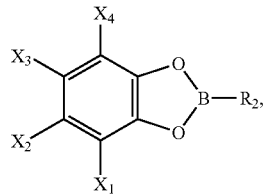

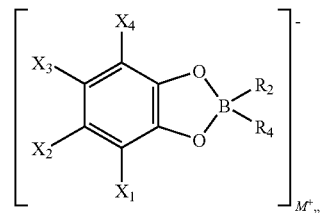

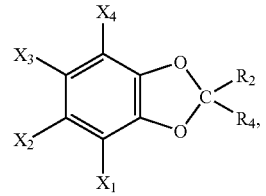

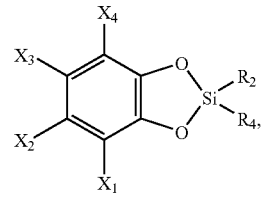

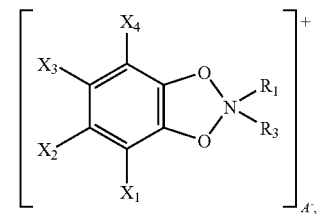

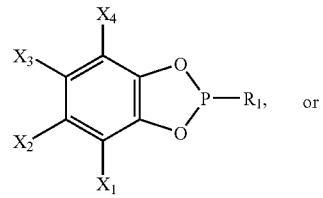

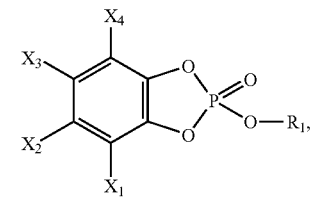

wherein each R$_1$ and R$_3$ is independently a hydrogen, an alkyl group, an aryl group, a haloalkyl group, or a haloaryl group; each R$_2$ and R$_4$ is independently a halogen atom, an alkyl group, an aryl group, a haloalkyl group, or a haloaryl group; M$^+$ is cation; and A$^-$ is an anion. M$^+$ is typically an alkali metal cation such as Li⁺, while A⁻ is typically a halide, though the invention is not so limited. Representative compounds of the invention are either commercially available or may be synthesized by known methods. Thus, for example, IIB may be prepared by slight modification of the procedures reported in Lee, et al., J. Electrochem. Soc. 152(9): A1429-35 (2004).

As will be appreciated by those of skill in the art, certain compounds such as Formula IIC and IIF exist as charged species. Thus, in IIB, the boron-based group is also a Lewis acid and readily complexes with other anions to form IIC. In some cases, a salt, MA, is added to form the anion redox shuttle, where M is a metallic cation (such as an alkali or alkaline earth metal cation) and A is selected from the group consisting of F, Cl, Br, and I. For instance, when the compound below

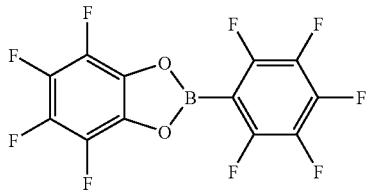

is mixed with LiF, a new anion redox shuttle can be formed as

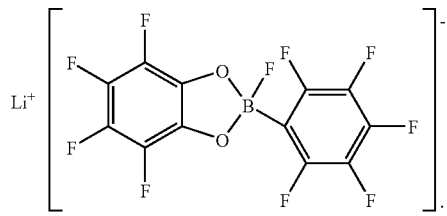

In some embodiments, the redox shuttle has the Formula IB. Representative Y and Z groups in Formula IB are independently selected from the following structures,

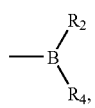

IIIA

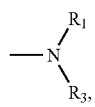

IIIB

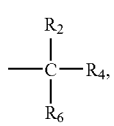

IIIC

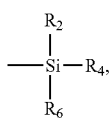

IIID

-continued

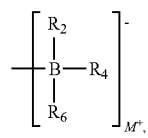

IIIE

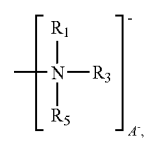

IIIF

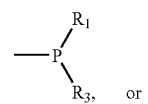

IIIG

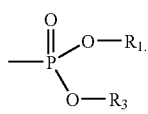

IIIH

In Formula IIIA-H, each $R_1$, $R_3$ and $R_5$ is independently a hydrogen, an alkyl group, an aryl group, a halogen substituted alkyl group, or a halogen substituted aryl group; each $R_2$, $R_4$ and $R_6$ is independently a halogen atom, an alkyl group, an aryl group, a halogen substituted alkyl group, or a halogen substituted aryl group; M⁺ is a cation; and A⁻ is an anion. In some embodiments, M⁺ is an alkali metal cation and A⁻ is a halide anion.

In some embodiments, the redox shuttle is a dimer or oligomer and has the structure:

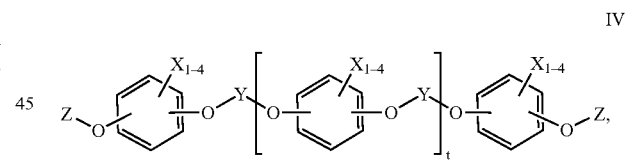

IV in which t is 0-8.

In still other embodiments, the redox shuttle has the Formula IC. In some embodiments of the Formula IC, the redox shuttle has the structure selected from

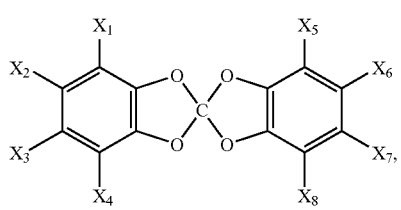

VA

-continued

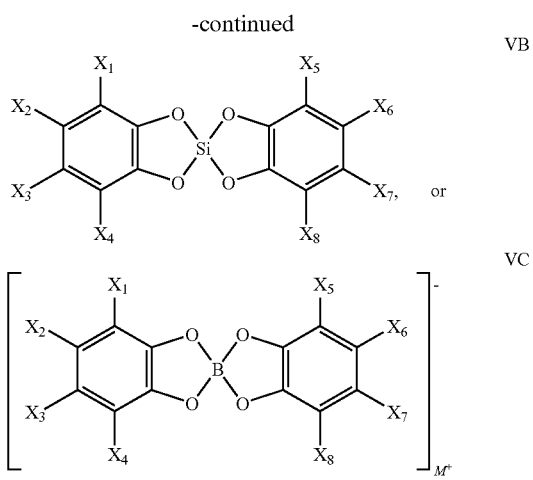

wherein M⁺ is a cation. In some embodiments, the cation is an alkali metal ion and the anion is a halide anion.

Exemplary redox shuttle additives include (tetrafluorobenzo-1,2-dioxyl)-pentafluorophenyl-borane, 1,2-bis(trimethylsiloxyl)tetrafluorobenzene, and mixtures thereof. The concentration of the redox shuttle additive ranges from about 0.0005 weight percent (wt %) to about 50 wt %, and more typically from about 0.0005 wt % to about 10 wt %.

Inventive electrolytes include an alkali metal salt dissolved in a polar aprotic solvent. The alkali metal salt can be present at a concentration of from about 0.5 to about 2 molar and is typically a lithium salt. Exemplary lithium salts include Li[B(C$_2$O$_4$)$_2$], Li[BF$_2$(C$_2$O$_4$)], Li[PF$_2$(C$_2$O$_4$)$_2$], LiClO$_4$, LiBF$_4$, LiAsF$_6$, LiPF$_6$, Li[CF$_3$SO$_3$], Li[N(CF$_3$SO$_2$)$_2$], Li[C(CF$_3$SO$_2$)$_3$], Li[N(SO$_2$C$_2$F$_5$)$_2$], lithium alkyl fluorophosphates, or a mixture of any two or more thereof. Lithium (chelato)borates such as Li[B(C$_2$O$_4$)$_2$] and Li[BF$_2$(C$_2$O$_4$)], or lithium (chelato)phosphates such as Li[PF$_2$(C$_2$O$_4$)$_2$] may also be used as the alkali metal salt, or as an electrode stabilizing additive. Thus, in some embodiments, the alkali metal salt may be other than Li[B(C$_2$O$_4$)$_2$], Li[BF$_2$(C$_2$O$_4$)], or Li[PF$_2$(C$_2$O$_4$)$_2$]; and the electrolyte may include, as a electrode stabilizing additive, Li[B(C$_2$O$_4$)$_2$], Li[BF$_2$(C$_2$O$_4$)], Li[PF$_2$(C$_2$O$_4$)$_2$], or a mixture of two or more thereof, at, e.g., about 0.001 to about 8 wt %.

Suitable polar aprotic solvents include, for example, ethyl acetate, propyl acetate, ethylene carbonate, propylene carbonate, dimethyl carbonate, diethyl carbonate, ethyl methyl carbonate, diethyl ether, methyl acetate, gamma-butyrolactone, sulfolane, or a mixture of any two or more thereof. Protic solvents such as water and alcohols cannot be used with the present invention.

There are further provided methods of making the non-aqueous electrolytes of the present invention. For example, in some embodiments, the method includes combining an alkali metal salt; a polar aprotic solvent; and redox shuttle additive as described herein, including but not limited to aromatic compounds having at least one aromatic ring with at least four electronegative substituents, two or more oxygen atoms bonded to the aromatic ring, and no hydrogen atoms bonded to the aromatic ring. In some such embodiments, the redox shuttle additive includes compounds of Formula IA, IB, and IC. In another embodiment, the redox shuttle additive includes compounds of Formula IIA-H, IIIA-H, IV and VA-C. The present methods can employ any of the alkali metal salts or polar aprotic solvents described herein.

While not wishing to be limited by any theory, it is believed that electrochemical devices of the present invention exhibit enhanced overcharge protection due to the nature of the redox shuttle additives present in the non-aqueous electrolytes. It is believed that in the prior art redox shuttle additives, it is the hydrogen atom(s) on the benzene ring that is responsible for the instability of the redox shuttles. When the battery is overcharged, the redox shuttle can be oxidized at the positive electrode, and the oxidized structure can lose a proton to form an active radical. The radical formed may then attack other redox shuttle molecules and initiate polymerization reactions. The redox shuttle can rapidly lose its mobility through a polymerization reaction and eventually lose its overcharge protection capability. Bulky substituents such as t-butyl groups have been used to retard radical formation at adjacent aryl hydrogens. However, the redox potential of such redox shuttles is limited and therefore unsuitable for many applications.

Redox shuttle additives of the present invention replace the aryl hydrogen atoms with heavier atoms that are also electronegative, e.g. halogens such as F, Cl, and Br. Such electronegative substitution raises the redox potential of the redox shuttle as well as stabilizing the redox shuttles against radical formation. It is further believed that replacement of methoxy groups with structures that are more rigid may also slightly raise the redox potential of the redox shuttle, and may enhance its stability in electrochemical devices such as lithium-ion batteries.

Electrolytes of the invention may include stabilizing additives that protect the electrodes from degradation. (See e.g., co-pending U.S. application Ser. Nos. 10/857,365, 11/279,120, and 11/338,902) Thus, electrolytes of the invention can include an electrode stabilizing additive that can be reduced or polymerized on the surface of a negative electrode to form a passivation film on the surface of the negative electrode. Likewise, inventive electrolytes can include an electrode stabilizing additive that can be oxidized or polymerized on the surface of the positive electrode to form a passivation film on the surface of the positive electrode. In some embodiments, electrolytes of the invention further include mixtures of the two types of electrode stabilizing additives. The additives are typically present at a concentration of about 0.001 to about 8 wt %.

Electrode stabilizing additives may generally be, a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1,3-butadiene carbonate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-3-vinylcyclohexanone, 2-amino-3-vinylcyclopropanone, 2-amino-4-vinylcyclobutanone, 2-amino-5-vinylcyclopentanone, 2-vinyl-[1,2]oxazetidine, vinyl methyl carbonate, 2-vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3-vinylaziridin-2-one, 3-vinylcyclobutanone, 3-vinylcyclopentanone, 3-vinyloxaziridine, 3-vinyloxetane, 3-vinylpyrrolidin-2-one, 4,4-divinyl-3-dioxolan-2-one, 4-vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy) cyclotriphosphazene, or (diaryloxy)(trifluoro)(methoxy) cyclotriphosphazene compounds, or a mixture of two or more thereof. In some embodiments, the electrode stabilizing additive is vinyl ethylene carbonate, vinyl carbonate, or 1,2-diphenyl ether, or a mixture of any two or more thereof.

Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxpyrrole, aryloxy ethylene sulfate, aryloxy pyrazine, aryloxy-carbazole trivinylphosphate, aryloxy-ethyl-2-furoate, 2-aryloxy-cyclopropanone, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4-divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy- carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, or a mixture of any two or more thereof.

Representative electrode stabilizing additives include stabilizing additives particularly suitable for use in the practice of the present invention include a substituted or unsubstituted spirocyclic hydrocarbons containing at least one oxygen atom and at least one alkenyl or alkynyl group. For example, such stabilizing additives include those having Formula V:

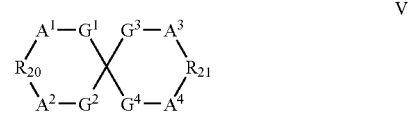

wherein
$A^1$, $A^2$, $A^3$, and $A^4$ are independently O or $CR_{22}R_{23}$; provided that $A^1$ is not O when $G^1$ is O, $A^2$ is not O when $G^2$ is O, $A^3$ is not O when $G^3$ is O, and $A^4$ is not O when $G^4$ is O;

$G^1$, $G^2$, $G^3$, and $G^4$ are independently O or $CR_{22}R_{23}$; provided that $G^1$ is not O when $A^1$ is O, $G^2$ is not O when $A^2$ is O, $G^3$ is not O when $A^3$ is O, and $G^4$ is not O when $A^4$ is O;

$R_{20}$ and $R_{21}$ are independently a substituted or unsubstituted divalent alkenyl or alkynyl group;

$R_{22}$ and $R_{23}$ at each occurrence are independently H, F, Cl, Br, or a substituted or an unsubstituted alkyl, alkenyl, or alkynyl group.

Representative examples of Formula V include but are not limited to 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. Furthermore, mixtures of any two or more electrode stabilizing additives may also be used in the electrolytes of the present invention.

In another aspect, the invention provides an electrochemical device comprising: a cathode; an anode; and an electrolyte as described herein. In one embodiment, the electrochemical device is a lithium secondary battery; the cathode is a lithium metal oxide cathode; the anode is a carbon or lithium metal anode; and the anode and cathode are separated from each other by a porous separator. In such devices the anode may comprise graphite, amorphous carbon, $Li_4Ti_5O_{12}$, tin alloys, silicon alloys, intermetallic compounds, lithium metal, or mixtures of any two or more thereof. Suitable graphitic materials including natural graphite, artificial graphite, graphitized meso-carbon microbeads, and graphite fibers, as well as any amorphous carbon materials. Typically, the cathode in such a cell includes spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x'}Ni_\alpha Mn_\beta Co_\gamma Met'_\delta O_{2-z'}F_{z'}$, $A_n B_2(XO_4)_3$ (NASICON), vanadium oxide, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \leq x \leq 0.3$, $0 \leq y \leq 0.5$, $0 \leq z \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$.

In the electrochemical cells of the present invention, the cathode can include spinel, olivine, or carbon-coated olivine (see Published U.S. patent application No. 2004/0157126). For example, the spinel can be a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. Alternatively, the cathode can comprise olivine with a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Cathodes of the present invention may be further stabilized by surface-coating the particles of the spinel or olivine with a material that can neutralize acid or otherwise lessen or prevent leaching of the manganese or iron ions. Hence the cathodes can also comprise a surface coating of a metal oxide on the spinel or olivine particles such as $ZrO_2$, $TiO_2$, $ZnO_2$, $WO_3$, $Al_2O_3$, $MgO$, $SiO_2$, $SnO_2$ $AlPO_4$, $Al(OH)_3$, a mixture of any two or more thereof, or any other suitable metal oxide. The coating can also be applied to a carbon-coated olivine. Where carbon-coated olivine is used, the metal oxide coating can be applied to the carbon-coated olivine or can be applied to the olivine first, followed by carbon coating of the metal oxide film. Methods for coating spinel cathodes with metal oxides are disclosed below and may be adapted for use with olivine cathodes.

The metal oxide coating on spinel can be applied using a variety of processes. For example, the coating element source can be dissolved in an organic solvent or water. The coating element sources include metal alkoxide, salt, or oxide (e.g., aluminum isopropoxide or magnesium methoxide). Spinel cathode materials are then dispersed in the coating solution and the resultant mixture stirred until the organic solvent is completely evaporated. If necessary, a flushing gas ($CO_2$ or moisture-free inert gas) may be used to help facilitate evaporation of the solvent in the coating solution. The dried, coated material is then heat-treated at a temperature ranging from about 100° C. to about 500° C.

A $TiO_2$ coating can be applied to spinel powders by hydroxylation of tetra-n-butyl titanate (TBT). Thus, for example, the titanate can be reacted with LiOH to precipitate the titanium hydroxide onto the spinel powder. The coated material may then be heat-treated at about 100° C. to about 400° C. to yield spinel particles with the desired oxide coating.

A sol-gel process may also be employed in the coating of the spinel. The coating materials including M-ethylhexanoate and M-isopropoxide (M=Zr, Al, Ti, B, Si, Sn) can be dissolved in alcohol (e.g., 2-propanol). The cathode materials are then mixed with the coating solution and annealed at from about 100° C. to about 500° C. Alternatively, a coating solution can be prepared by dissolving ethyl silicate in ethanol and water. Spinel powder is immersed in the coating solution, stirred, dried at 110° C., and then is calcined at from about 200° C. to about 500° C.

The process of coating spinel with $AlPO_4$ can be carried out by dissolving aluminum nitrate and ammonium phosphate in water until a light white suspension solution ($AlPO_4$ nanoparticles) is observed. Spinel cathode powder is then added to the coating solution and mixed. The slurry can be dried and annealed at from about 100° C. to about 500° C.

Colloidal suspensions may also be used to coat spinel with metal oxides. For example, the spinel powders can be coated using a 4 wt % (~0.3 mol %) colloidal $ZrO_2$ suspension. The spinel particles are immersed and stirred in the $ZrO_2$ suspension for about 1 h, followed by evaporation of the nascent liquid at 75° C. Thereafter, the products can be heated at about 200 to 400 or 500° C.

Alternatively, the $ZrO_2$ coating of spinel can be carried out by using two different coating solutions (zirconium oxide+ polymeric precursor or an aqueous solution of zirconium nitrate). Spinel could be mixed with the coating solutions until the mixture is dry. Then the mixture could be heated at 100° C. to evaporate the solvents in the coating solutions. The dried mixture could be heat-treated at 200-500° C.

A $ZnO_2$ coating can be applied to the spinel by dissolving zinc acetate in water, followed by adding the spinel powder, and thoroughly mixing for about 4 h at room temperature. After drying, the coated powder is heated at 120° C., and is further calcined at about 200° C. to about 400° C.

Finally, spinel can be coated using a co-precipitation process. Spinel powder is dispersed into a $NaHCO_3$ solution and ultrasonically agitated. The suspension is then stirred mechanically while $Al_2(SO_4)_3$ solution is added drop wise to it. In this way, $Al(OH)_3$ is precipitated onto the spinel particle surface. The final powder is filtered, washed, and dried. The dried powder is heated in air at about 200° C. to about 600° C.

Electrochemical devices employing electrodes comprised of blends of materials are also within the scope of the present invention. For example, the cathode can include a blend of spinel and $Li_{1+x'}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. The ratio of spinel to $Li_{1+x'}Ni_\alpha Mn_\beta Co_\gamma Met'_\delta O_{2-z'}F_{z'}$ is typically from about 0.5 to about 98 wt %. Suitable cathodes can also include a blend of olivine or carbon-coated olivine and $Li_{1+x'}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. As before, the ratio of olivine or carbon-coated olivine to $Li_{1+x'}Ni_\alpha Mn_\beta Co_\gamma Met'_\delta O_{2-z'}F_{z'}$ can be from about 0.5 to about 98 wt %.

The porous separator may be made from materials well known to those skilled in the art. Typically, the porous separator comprises polypropylene, polyethylene, or a multilayer laminate of polypropylene and polyethylene.

Thus, in accordance with one embodiment, the electrochemical device of the invention includes a spinel, olivine, or carbon-coated olivine cathode; a graphite or amorphous carbon anode; and a substantially non-aqueous electrolyte comprising an alkali metal salt that is $Li[B(C_2O_4)_2]$, $Li[BF_2(C_2O_4)]$, or $Li[PF_2(C_2O_4)_2]$; a polar aprotic solvent that is ethyl acetate, propyl acetate, ethylene carbonate, propylene carbonate, dimethyl carbonate, diethyl carbonate, ethyl methyl carbonate, dimethyl ether, gamma-butyrolactone, sulfolane, or a mixture of any two or more thereof; a redox shuttle additive that is (tetrafluorobenzo-1,2-dioxyl)pentafluorophenyl-borane, 1,2-bis(trimethylsiloxyl)tetrafluorobenzene, or a mixture thereof; and an electrode stabilizing additive that is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, or a mixture of any two or more thereof.

The following terms are used throughout as defined below.

Electronegative substituents on an aromatic ring are those substituents which tend to attract electrons and therefore withdraw electron density from the aromatic ring. Typical electronegative substituents include halogen, haloalkyl, —CN, and $NO_2$.

Spirocyclic hydrocarbons include ring systems comprising carbon and hydrogen and having two or more rings in which at least two of the rings are joined at a single carbon.

The term "spinel" refers to manganese-based spinel such as, e.g., $Li_{1+x}Mn_{2-z}Met'''_yO_{4-m}X'_n$, wherein Met''' is Al, Mg, Ti, B, Ga, Si, Ni, or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In various embodiments of the invention, spinel includes any one or more manganese-based compositions having the above formula.

The term "olivine" refers to iron-based olivine such as, e.g., $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In various embodiments of the invention, olivine includes any one or more iron-based olivine compositions having the above formula.

Alkyl groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, isopentyl, tert-pentyl, and neopentyl groups. Representative substituted alkyl groups may be substituted one or more times with, for example, amino, thio, hydroxy, cyano, alkoxy, carboxy, carboxamide, oxo, imino, and/or halo groups such as F, Cl, Br, and I groups.

Haloalkyl groups and halogen substituted groups are substituted alkyl groups as defined above in which one or more hydrogens have been replaced with one or more halogens such as fluorine, chlorine, bromine, and iodine. Haloalkyl groups may contain one or more different halogen atoms. Fluoroalkyl groups are haloalkyl groups in which the halogen(s) are fluorine.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to, 2,2-; 2,3-; 2,4-; 2,5-; or 2,6-disubstituted cyclohexyl groups or mono-, di- or tri-substituted norbornyl or cycloheptyl groups, which may be substituted with, for example, alkyl, alkoxy, amino, thio, hydroxy, cyano, alkoxy, carboxy, carboxamide, oxo, imino, and/or halo groups such as F, Cl, Br, and I groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups include, for instance but not limited to, vinyl, propenyl, 2butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e. alkenyl groups with two points of attachment, include but not limited to CH—CH=$CH_2$, C=$CH_2$, or C=$CHCH_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to CH—C≡CH.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to, 2-; 3-; 4-; 5-; or 6-substituted phenyl or naphthyl groups, which may be substituted with groups including, but not limited to, amino, alkoxy, alkyl, cyano, and/or halo.

Haloaryl groups and halogen substituted aryl groups are substituted aryl groups as defined above in which one or more hydrogens have been replaced with one or more halogens such as fluorine, chlorine, bromine, and iodine. Haloaryl groups may contain one or more different halogen atoms. Fluoroaryl groups are haloaryl groups in which the halogen(s) are fluorine.

One skilled in the art will readily realize that all ranges discussed can and do necessarily also describe all subranges therein for all purposes, and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

FIG. 1 shows the cyclic voltammogram of an electrolyte of 1.2 M LiPF$_6$ in EC/PC/DMC (1:1:3 by weight) with 3 wt % (tetrafluorobenzo-1,2-dioxyl)-pentafluorophenyl-borane. One pair of reversible peaks shows up at about 4.4 V vs. Li. It is well know that the main electrolyte components (EC, PC, DMC, and LiPF$_6$) are electrochemically stable up to 4.8 V vs. Li or higher. The reversible electrochemical reaction at 4.4 V vs. Li is therefore assigned to the redox reaction of (tetrafluorobenzo-1,2-dioxyl)-pentafluorophenyl-borane. Its high reversibility makes it promising as a redox shuttle for overcharge protection of lithium-ion batteries. Moreover, the redox potential of (tetrafluorobenzo-1,2-dioxyl)-pentafluorophenyl-borane (4.4 V vs. Li) is high enough to protect all the state-of-art positive electrode materials for lithium-ion batteries.

Example 2

Figure 2:
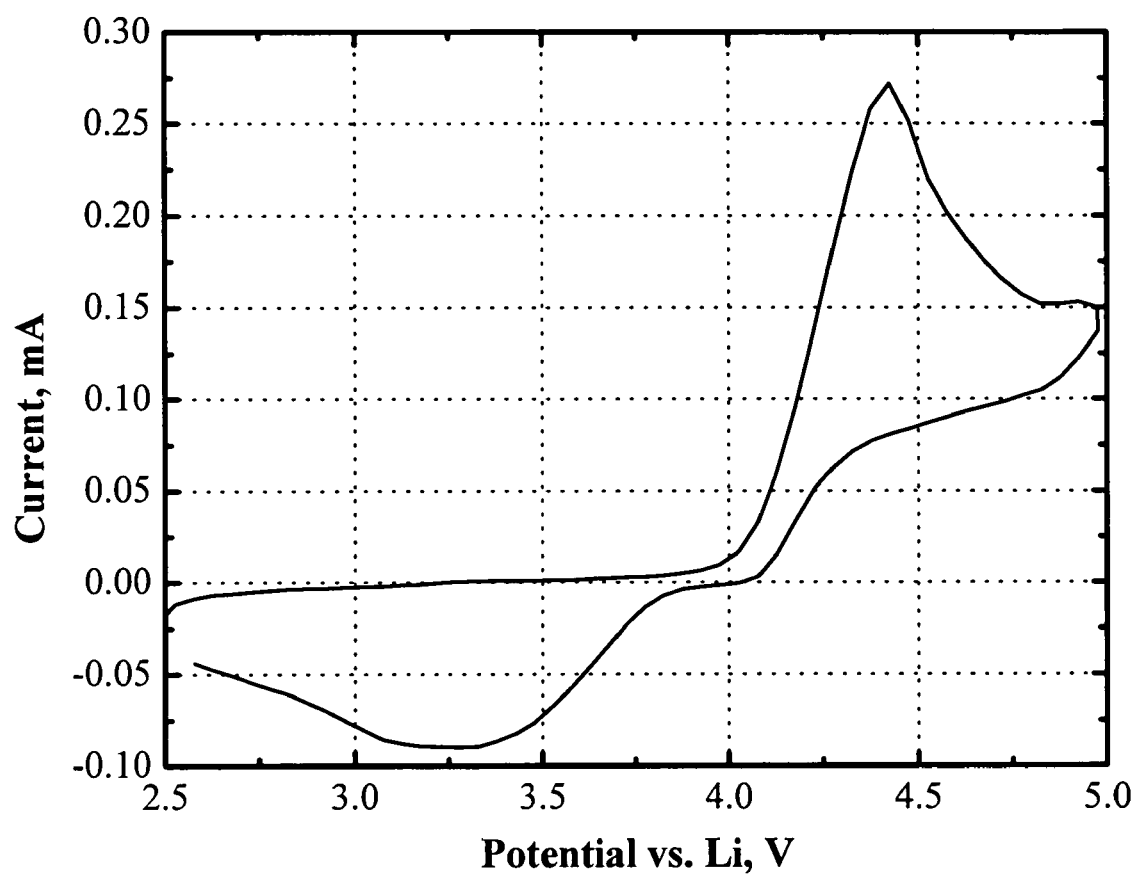
FIG. 2 is a cyclic voltammogram of 1.0 M $LiPF_6$ in EC/DEC (1:1) with 4.6 wt % 1,2-bis(trimethylsiloxyl)tetrafluorobenzene using a three electrode system (Pt working Electrode, Li counter electrode and Li reference electrode).

FIG. 2 shows the cyclic voltammogram of an electrolyte of 1.0 M LiPF$_6$ in EC/DEC (1:1, by weight) with 4.6 wt % 1,2-bis(trimethylsiloxyl)-tetrafluorobenzene. The oxidation reaction was triggered at about 4.1 V vs. Li, and the oxidation current peaks at 4.4 V vs. Li. The reducing reaction shows up as a big hump during the reverse scan. The reduction current peaks at about 3.3 V vs. Li. In case of overcharging, the reduction reaction occurs at the negative electrodes, whose potential is always around 0 V vs. Li (<<3.3 V). Therefore, 1,2-bis(trimethylsiloxyl)-tetrafluorobenzene is also capable of protecting lithium-ion batteries from being overcharged.

Example 3

Figure 3:
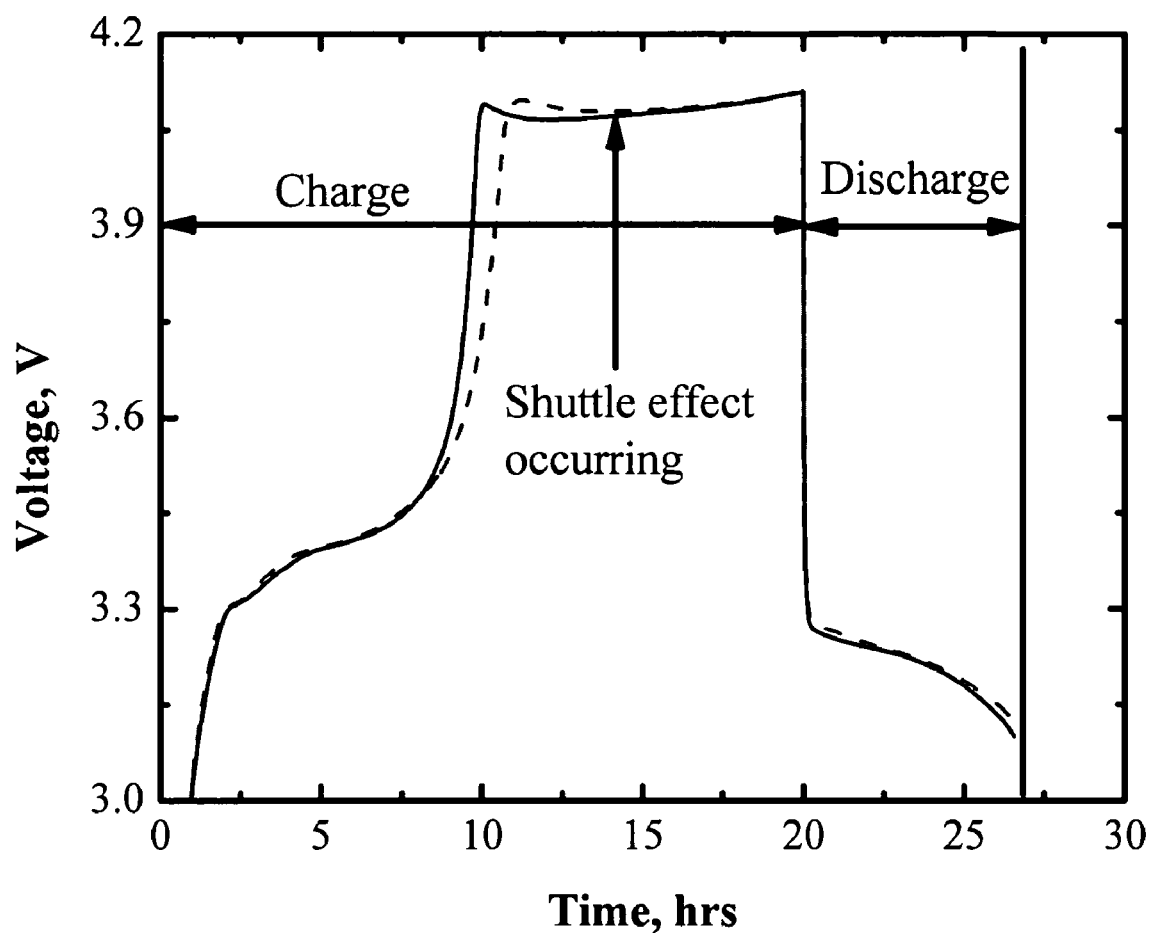
FIG. 3 is a graph of cell potential vs. time for two $LiFePO_4$/MCMB cells containing 10 wt % (tetrafluorobenzo-1,2-dioxyl)pentafluorophenyl-borane. The electrolyte used is 1.2 M $LiPF_6$ in EC/PC/DMC (1:1:3 by weight).

FIG. 3 shows the voltage profile of two LiFePO$_4$/MCMB (meso-carbon microbeads) cells containing 8 wt % (tetrafluorobenzo-1,2-dioxyl)-pentafluorophenyl-borane. The electrolyte used is 1.2 M LiPF$_6$ in EC/PC/DMC (1:1:3 by weight). Both cells were charged at a C/10 rate for 10 hours, and then discharged at a C/10 rate to 3.0 V. During the first 10 hours of testing, the normal charging plateau for the LiFePO$_4$/graphite cell is observed at about 3.4 V. Once the cells are fully charged, the potential rises rapidly until approximately 4.15 V, where the shuttle is activated and carries the current through the lithium-ion cells. Therefore, the cell voltage is nearly invariant under the help of the redox shuttle added otherwise the cell voltage would rise rapidly until triggering electrochemical reaction of the cell components. After the 20 hours charging period, the current was reversed and the cell was discharged to a cutoff voltage of 3.0 V.

Example 4

Figure 4:
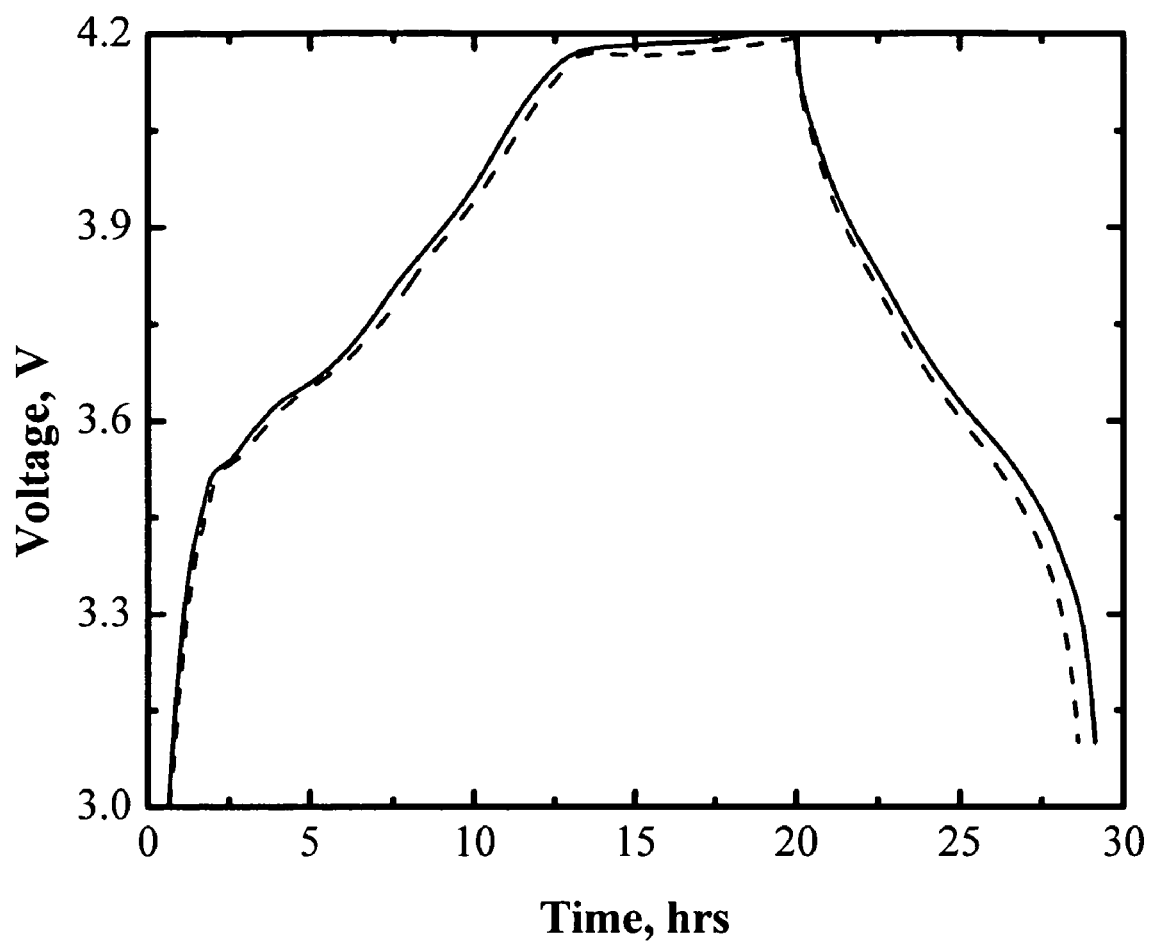
FIG. 4 is a graph of cell potential vs. time for two $LiNi_{0.8}Co_{0.15}Al_{0.05}O_2$/MAG-10 graphite cells containing 10 wt % (tetrafluorobenzo-1,2-dioxyl)pentafluorophenyl-borane. The electrolyte used is 1.2 M $LiPF_6$ in EC/PC/DMC (1:1:3 by weight).

FIG. 4 shows equivalent test results of two LiNi$_{0.8}$Co$_{0.15}$Al$_{0.05}$O$_2$/MAG-10 graphite cells containing 3 wt % (tetrafluorobenzo-1,2-dioxyl)pentafluorophenyl-borane. The electrolyte used is 1.2 M LiPF$_6$ in EC/PC/DMC (1:1:3 by weight). The overcharge protection mechanism of (tetrafluorobenzo-1,2-dioxyl)pentafluorophenyl-borane is activated at about 4.2 V.

Example 5

Figure 5:
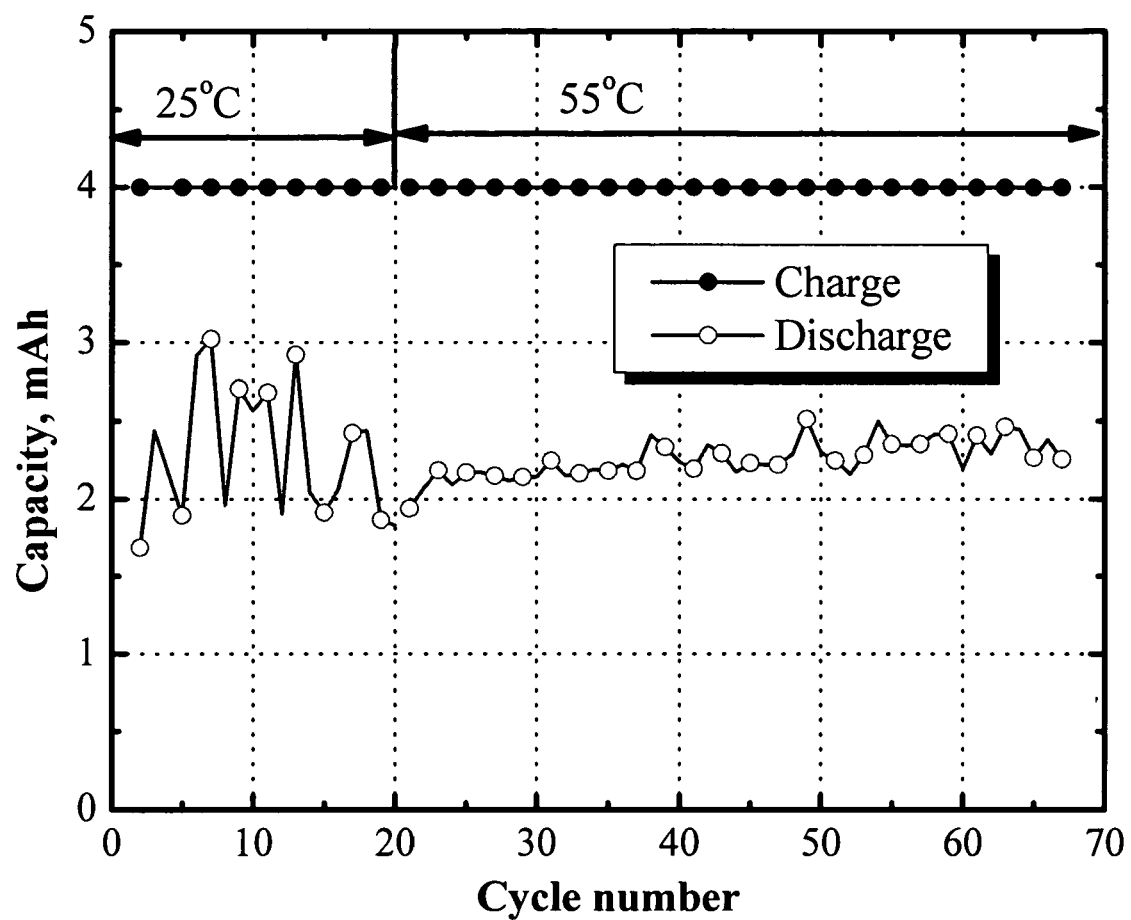
FIG. 5 is a graph of capacity vs. cycle number of a $LiNi_{0.8}Co_{0.15}Al_{0.05}O_2$/MAG-10 graphite cells containing 5 wt % (tetrafluorobenzo-1,2-dioxyl)pentafluorophenyl-borane and 1 wt % LiF. The cell was 100% overcharged. The electrolyte used is 1.0 M $LiPF_6$ in EC/DEC (3:7).

FIG. 5 shows the cycling capacity of a LiNi$_{0.8}$Co$_{0.15}$Al$_{0.05}$O$_2$/MAG-10 graphite cells containing 5 wt % (tetrafluorobenzo-1,2-dioxyl)pentafluorophenyl-borane and 1 wt % LiF. In this case, the final redox shuttle has the following structure:

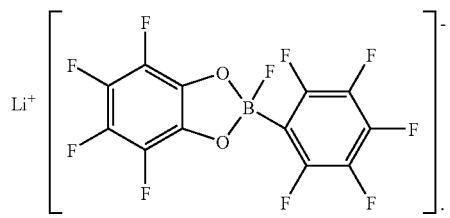

The electrolyte used is 1.0 M LiPF$_6$ in EC/DEC (3:7). The cell was charged at a C/10 rate for 20 hours and then discharged at a C/10 rate to a cutoff voltage of 3.0 V. The cell was initially cycled at 25° C. for 20 cycles and then cycled at 55° C. FIG. 5 clearly shows that the practical capacity of the cell is about 2.0 mAh. During cycle, the cell was forced to charge at 4.0 mAh, which gives about 100% overcharge. The capacity difference between charge and discharge (~100% practical capacity) is delivered by the shuttle mechanism of (tetrafluorobenzo-1,2-dioxyl)pentafluorophenyl-borane. FIG. 5 also shows that the redox shuttle added had delivered almost 60 times the practical capacity of the cell while the cell is still in its excellent working condition. No capacity fading on the discharge step was observed even when the cell was heavily overcharged at 55° C.

What is claimed is:
1. An electrolyte comprising:
   an alkali metal salt;
   a polar aprotic solvent; and
   a redox shuttle additive that is an aromatic compound having at least one aromatic ring with four or more electronegative substituents, two or more oxygen atoms bonded to the aromatic ring, and no hydrogen atoms bonded to the aromatic ring; and
   wherein:
   the electrolyte solution is substantially non-aqueous; and
   the redox shuttle additive has the Formula IA or IC:

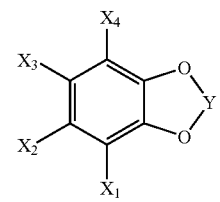

IA

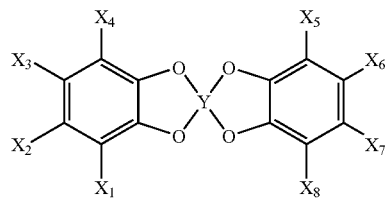

IC

X$_{1-8}$ are each independently selected from —F, —Cl, —Br, haloalkyl, —CN, or —NO$_2$; and
Y and Z are independently a group having a N, B, C, Si, S, or P atom, wherein the N, B, C, Si, S, or P atom is attached to at least one of the two or more oxygen atoms bonded to the aromatic ring.

2. The electrolyte of claim 1 wherein the redox shuttle additive has a redox potential of 3 V to 5.5 V in the electrolyte.

3. The electrolyte of claim 1 wherein the redox shuttle additive has two, three, or four oxygen atoms bonded to the aromatic ring.

4. The electrolyte of claim 1 wherein the electronegative substituents are selected from halogen, haloalkyl, —CN, or —NO$_2$.

5. The electrolyte of claim 1 wherein the redox shuttle additive has the Formula IA:

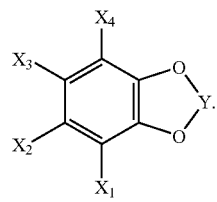

6. The electrolyte of claim 5 wherein the redox shuttle additive has the structure selected from

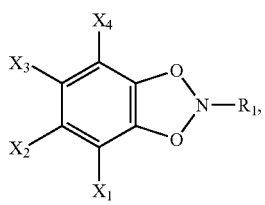
IIA

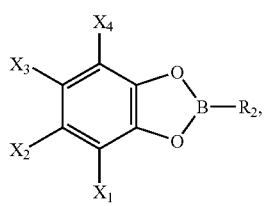
IIB

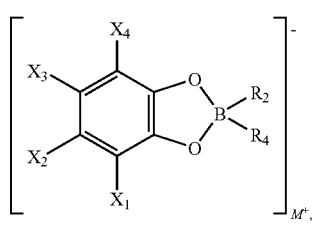
IIC

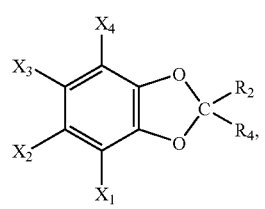
IID

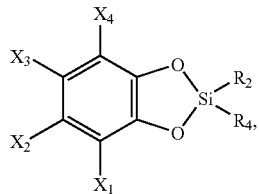
IIE

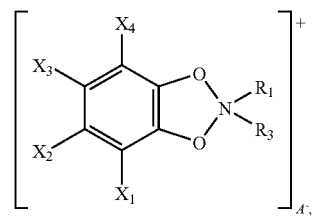
IIF

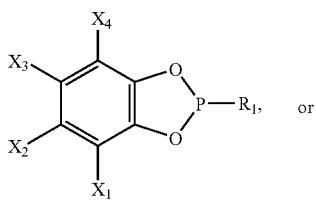
IIG or

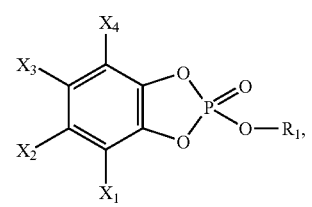
IIH wherein
each $R_1$ and $R_3$ is independently a hydrogen, an alkyl group, an aryl group, a haloalkyl group, or a haloaryl group;
each $R_2$ and $R_4$ is independently a halogen atom, an alkyl group, an aryl group, a haloalkyl group, or a haloaryl group;
$M^+$ is a cation; and
$A^-$ is an anion.

7. The electrolyte of claim 6, wherein $M^+$ is an alkali metal cation and $A^-$ is a halide anion.

8. The electrolyte of claim 1, wherein the redox shuttle additive has the Formula IC:

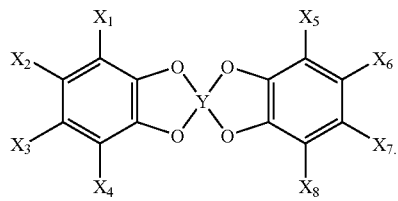
IC

9. The electrolyte of claim 8, wherein the redox shuttle additive has the structure selected from

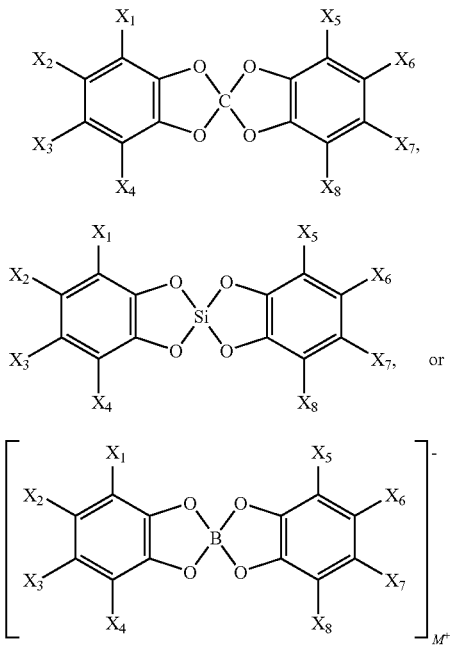

wherein M⁺ is a cation.

10. The electrolyte of claim 1, wherein the redox shuttle additive is (tetrafluorobenzo-1,2-dioxyl)-pentafluorophenylborane, 1,2-bis(trimethylsiloxyl)tetrafluorobenzene, or a mixture thereof.

11. The electrolyte of 1, wherein the redox shuttle additive is a mixture of two or more aromatic compounds.

12. The electrolyte of claim 1 wherein the concentration of the redox shuttle additive ranges from 0.0005 wt % and 50 wt %.

13. The electrolyte of claim 1 wherein the alkali metal salt is a lithium salt.

14. The electrolyte of claim 1 wherein the alkali metal salt is Li[B(C$_2$O$_4$)$_2$], Li[BF$_2$(C$_2$O$_4$)], Li[PF$_2$(C$_2$O$_4$)$_2$], LiClO$_4$, LiBF$_4$, LiAsF$_6$, LiPF$_6$, Li[CF$_3$SO$_3$], Li[N(CF$_3$SO$_2$)$_2$], Li[C(CF$_3$SO$_2$)$_3$], Li[N(SO$_2$C$_2$F$_5$)$_2$], lithium alkyl fluorophosphates, or a mixture of any two or more thereof.

15. The electrolyte of claim 1, wherein the polar aprotic solvent is ethyl acetate, propyl acetate, ethylene carbonate, propylene carbonate, dimethyl carbonate, diethyl carbonate, ethyl methyl carbonate, diethyl ether, methyl-acetate, gamma-butyrolactone, sulfolane, or a mixture of any two or more thereof.

16. The electrolyte of claim 1 further comprising an electrode stabilizing additive that can be reduced or polymerized on the surface of a negative electrode to form a passivation film on the surface of negative electrode.

17. The electrolyte of claim 1 further comprising an electrode stabilizing additive that can be oxidized or polymerized on the surface of positive electrode to form a passivation film on the surface of the positive electrode.

18. The electrolyte of claim 17, further comprising an electrode stabilizing additive that can be reduced or polymerized on the surface of a negative electrode to form a passivation film on the surface of negative electrode.

19. The electrolyte of claim 18 wherein the electrode stabilizing additives are independently selected from 1,2-divinyl furoate, 1,3-butadiene carbonate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-3-vinylcyclohexanone, 2-amino-3-vinylcyclopropanone, 2-amino-4-vinylcyclobutanone, 2-amino-5-vinylcyclopentanone, 2-vinyl [1,2]oxazetidine, vinyl methyl carbonate, 2-vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3-vinylaziridin-2-one, 3-vinylcyclobutanone, 3-vinyl-cyclopentanone, 3-vinyloxaziridine, 3-vinyloxetane, 3-vinylpyrrolidin-2-one, 4,4-divinyl-3-dioxolan-2-one, 4-vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcyclopropanone, vinylethylene oxide, β-vinyl-γ-butyrolactone, (divinyl)(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene, (diaryloxy)(trifluoro)(methoxy)cyclotriphosphazene compounds, 1,2-diphenyl ether, aryloxpyrrole, aryloxy ethylene sulfate, aryloxy pyrazine, aryloxy-carbazole trivinylphosphate, aryloxy-ethyl-2-furoate, 2-aryloxy-cyclopropanone, aryloxy-o -terphenyl, aryloxy-pyridazine, butyl-aryloxy-ether, divinyl diphenyl ether, (tetrahydro -furan-2-yl)-vinylamine, divinyl methoxy-bipyridine, methoxy-4-vinylbiphenyl, vinyl methoxy carbazole, vinyl methoxy piperidine, vinyl methoxypyrazine, allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4-divinyl-l-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy- carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4- dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, or a mixture of any two or more thereof.

20. The electrolyte of claim 1 wherein the alkali metal salt is other than $Li[B(C_2O_4)_2]$, $Li[BF_2(C_2O_4)]$, or $Li[PF_2(C_2O_4)_2]$, and the electrolyte further comprises about 0.001 to about 8 wt % of an electrode stabilizing additive that is $Li[B(C_2O_4)_2]$, $Li[BF_2(C_2O_4)]$, $Li[PF_2(C_2O_4)_2]$, or a mixture thereof.

21. The electrolyte of claim 18 further comprising an electrode stabilizing additive that is a substituted or unsubstituted spirocyclic hydrocarbon containing at least one oxygen atom and at least one alkenyl or alkynyl group;
wherein the electrode stabilizing additive has the Formula V:

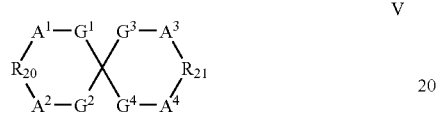

wherein
$A^1, A^2, A^3, A^4$ are independently O or $CR_{22}R_{23}$; provided that $A^1$ is not O when $G^1$ is O, $A^2$ is not O when $G^2$ is O, $A^3$ is not O when $G^3$ is O, and $A^4$ is not O when $G^4$ is O;
$G^1, G^2, G^3$, and $G^4$ are independently O or $CR_{22}R_{23}$; provided that $G^1$ is not O when $A^1$ is O, $G^2$ is not O when $A^2$ is O, $G^3$ is not O when $A^3$ is O, and $G^4$ is not when $A^4$ is O;
$R_{20}$ and $R_{21}$ are independently a substituted or unsubstituted divalent alkenyl or alkynyl group;
$R_{22}$ and $R_{23}$ at each occurrence are independently H, F, Cl, Br, or a substituted or an unsubstituted alkyl, alkenyl, or alkynyl group.

22. The electrolyte of claim 21 wherein the electrode stabilizing additive is 3,9-divinyl-2, 4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro [5.5]undecane, 3,9-diethylidene-2,4,8-trioxaspiro[5.5]undecane, 3,9-diethylidene -2,4-dioxaspiro [5.5]undecane, 3,9-dimethylene-2,4,8,10-tetraoxaspiro [5.5]undecane, 3,9-divinyl-1,5,7,11-tetraoxaspiro[5.5]undecane, 3,9-dimethyl ene-1,5,7,11-tetraoxaspiro [5.5]undecane, 3,9-diethylidene-1,5,7,11-tetraoxaspiro [5.5]undecane, or a mixture of any two or more thereof.

23. A method of preparing the electrolyte of claim 1 comprising combining an alkali metal salt; a polar aprotic solvent; and redox shuttle additive that is an aromatic compound having at least one aromatic ring with four or more electronegative substituents, two or more oxygen atoms bonded to the aromatic ring, and no hydrogen atoms bonded to the aromatic ring.

24. An electrolyte comprising:
an alkali metal salt;
a polar aprotic solvent; and
a redox shuttle additive that is an aromatic compound having at least one aromatic ring with four or more electronegative substituents, two or more oxygen atoms bonded to the aromatic ring, and no hydrogen atoms bonded to the aromatic ring; and
wherein:
the electrolyte solution is substantially non-aqueous; and the redox shuttle additive has the Formula IB:

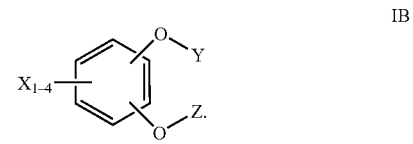

$X_{1-8}$ are each independently selected from —F, —Cl, —Br, haloalkyl, —CN, or —NO$_2$;
wherein:
Y and Z are independently selected from the following structures,

wherein
each $R_1$, $R_3$ and $R_5$ is independently a hydrogen, an alkyl group, an aryl group, a halogen substituted alkyl group, or a halogen substituted aryl group;
each $R_2$, $R_4$ and $R_6$ is independently a halogen atom, an alkyl group, an aryl group, a halogen substituted alkyl group, or a halogen substituted aryl group;
$M^+$ is a cation; and
$A^-$ is an anion.

25. The electrolyte of claim 24 wherein the redox shuttle additive has the structure:

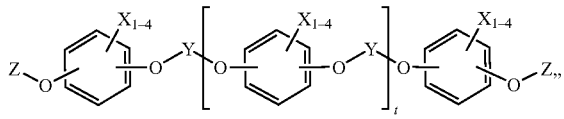

and t is 0-8.

26. The electrolyte of claim 24 further comprising an electrode stabilizing additive that can be reduced or polymerized on the surface of a negative electrode to form a passivation film on the surface of negative electrode.

27. The electrolyte of claim 21 wherein each electrode stabilizing additive is present at a concentration of about 0.001 to about 8 wt %.

28. The electrolyte of claim 24 further comprising an electrode stabilizing additive that can be oxidized or polymerized on the surface of positive electrode to form a passivation film on the surface of the positive electrode.

29. The electrolyte of claim 28, further comprising an electrode stabilizing additive that can be reduced or polymerized on the surface of a negative electrode to form a passivation film on the surface of negative electrode.

* * * * *

UNITED STATES PATENT AND TRADEMARK OFFICE
CERTIFICATE OF CORRECTION

PATENT NO. : 7,851,092 B2
APPLICATION NO. : 11/366891
DATED : December 14, 2010
INVENTOR(S) : Khalil Amine, Zonghai Chen and Qingzheng Wang It is certified that error appears in the above-identified patent and that said Letters Patent is hereby corrected as shown below:

In claim 19, column 20, line 2: "2,4diviny1" should be "2,4divinyl";

In claim 21, line 16: please insert an --O-- before "when $A^4$ is O;"

In claim 24, figure (IIIF) shows a "-" after it, and should instead show a "+".

Signed and Sealed this
Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,851,092 B2 | Page 1 of 1 |
| APPLICATION NO. | : 11/366891 | |
| DATED | : December 14, 2010 | |
| INVENTOR(S) | : Khalil Amine, Zonghai Chen and Qingzheng Wang | |

It is certified that error appears in the above-identified patent and that said Letters Patent is hereby corrected as shown below:

In claim 19, column 20, line 2: "2,4diviny1" should be "2,4divinyl";

Column 21, line 32 (claim 21, line 16) please insert an --O-- before "when $A^4$ is O;"

Column 22, claim 24, figure (IIIF) shows a "-" after it, and should instead show a "+".

This certificate supersedes the Certificate of Correction issued September 13, 2011.

Signed and Sealed this
Eleventh Day of October, 2011

David J. Kappos
*Director of the United States Patent and Trademark Office*